(12) United States Patent
Lv

(10) Patent No.: US 12,219,251 B2
(45) Date of Patent: Feb. 4, 2025

(54) CAMERA CONTROL METHOD AND SYSTEM, AND ELECTRONIC DEVICE

(71) Applicant: Huawei Technologies Co., Ltd., Shenzhen (CN)

(72) Inventor: Fei Lv, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 275 days.

(21) Appl. No.: 17/921,255

(22) PCT Filed: Mar. 30, 2021

(86) PCT No.: PCT/CN2021/083773
§ 371 (c)(1),
(2) Date: Oct. 25, 2022

(87) PCT Pub. No.: WO2021/218527
PCT Pub. Date: Nov. 4, 2021

(65) Prior Publication Data
US 2023/0164430 A1    May 25, 2023

(30) Foreign Application Priority Data

Apr. 26, 2020 (CN) .......................... 202010340544.8
Jul. 17, 2020 (CN) .......................... 202010690972.3

(51) Int. Cl.
*H04N 23/661* (2023.01)
*H04N 7/12* (2006.01)
(Continued)

(52) U.S. Cl.
CPC ............ *H04N 23/661* (2023.01); *H04N 7/12* (2013.01); *H04N 23/60* (2023.01); *H04N 23/65* (2023.01); *H04N 23/695* (2023.01)

(58) Field of Classification Search
None
See application file for complete search history.

(56) References Cited

U.S. PATENT DOCUMENTS

2007/0098385 A1    5/2007  Tanaka et al.
2014/0047143 A1*   2/2014  Bateman ............ H04L 65/1069
                                              710/72
(Continued)

FOREIGN PATENT DOCUMENTS

CN    105025327 A    11/2015
CN    106454067 A     2/2017
(Continued)

*Primary Examiner* — Quan Pham
(74) *Attorney, Agent, or Firm* — Conley Rose, P.C.

(57) ABSTRACT

An electronic device comprises a display apparatus, a photographing apparatus, and a lifting apparatus. The photographing apparatus receives, through the first channel or a second channel, a first stream on instruction triggered by a first application. The second channel is a channel between the display apparatus and the photographing apparatus, and the first stream on instruction is used to instruct the photographing apparatus to collect an image and output the collected image to the first application. The photographing apparatus reports a first stream on state to a proxy module in the display apparatus through the first channel. The proxy module in the display apparatus controls, based on the first stream on state, the lifting apparatus to lift the photographing apparatus. The photographing apparatus after being lifted starts to collect an image, and outputs the collected image to the first application through the second channel.

18 Claims, 7 Drawing Sheets

(51) Int. Cl.
*H04N 23/60* (2023.01)
*H04N 23/65* (2023.01)
*H04N 23/695* (2023.01)

(56) References Cited

U.S. PATENT DOCUMENTS

| | | | |
|---|---|---|---|
| 2018/0063361 A1* | 3/2018 | Goo | H04N 1/2141 |
| 2019/0014201 A1* | 1/2019 | Bao | H04N 23/698 |
| 2019/0163242 A1 | 5/2019 | Zeng et al. | |
| 2019/0289166 A1 | 9/2019 | Harada | |

FOREIGN PATENT DOCUMENTS

| | | | |
|---|---|---|---|
| CN | 108881202 A | 11/2018 | |
| CN | 108924290 A | 11/2018 | |
| CN | 208859247 U | 5/2019 | |
| CN | 110107785 A | 8/2019 | |
| CN | 110225162 A | 9/2019 | |
| CN | 110290317 A | 9/2019 | |
| CN | 110460703 A | 11/2019 | |
| CN | 110519506 A | 11/2019 | |
| EP | 3336811 B1 | 3/2020 | |
| JP | 2009049946 A | 3/2009 | |
| JP | 2019161507 A | 9/2019 | |

\* cited by examiner

CONT.
FROM
FIG. 5A

S309 — The application D controls stream-on of the camera through a system native camera interface or an interface in the cameraproxy module, that is, sends a stream-on instruction to the camera S310 — After receiving the stream-on instruction sent by the application D, the camera starts to send the collected image to the application D It should be noted that, when receiving the stream-on instruction sent by the application D, the camera is already in a stream-on state. Therefore, the camera may not report the stream-on status to the cameraproxy module S311 — The user closes the application D, or disables a function in the application D that uses the camera S312 — The application D controls stream-off of the camera through a system native camera interface or an interface in the cameraproxy module, that is, sends a stream-off instruction to the camera S313 — After receiving the stream-off instruction sent by the application D, the camera stops sending the captured image to the application D. In addition, the camera determines that the application C still uses the camera, that is, the camera does not receive the stream-off instruction (the identifier of the background resident application may be carried) sent by the application C. In this case, the camera does not report the stream-off status to the cameraproxy module

FIG. 5B

CAMERA CONTROL METHOD AND SYSTEM, AND ELECTRONIC DEVICE

CROSS-REFERENCE TO RELATED APPLICATIONS

This is a U.S. National Stage of International Patent Application No. PCT/CN2021/083773; filed on Mar. 30, 2021, which claims priorities to Chinese Patent Application No. 202010340544.8, filed; on Apr. 26, 2020 and Chinese Patent Application No. 202010690972.3; filed on Jul. 17, 2020. All of the aforementioned applications are incorporated herein by reference in their entireties.

TECHNICAL FIELD

This application relates to the field of mobile communications technologies, and in particular, to a camera control method and system, and an electronic device.

BACKGROUND

Currently, a large-screen device is usually provided with a camera, and the camera is installed on a lifting component. The large-screen device (referred to as a large screen for short) controls lifting or retracting of a camera by controlling lifting or lowering of the lifting component. The large-screen device is a large screen in an intuitive color television or a rear projection television, for example, a large-screen LED display or a large-screen LCD display. Usually, a diagonal size of the large-screen device is greater than 40 inches. In the following, the lifting component is also referred to as a motor.

A camera of the large screen is connected to a main board over a USB (Universal Serial Bus, universal serial bus), and is similar to an external USB camera. The large screen and the camera are two different systems.

When the camera needs to collect an image, the large screen needs to lift the camera. When the camera stops working, that is, stops collecting an image, the large screen retracts the camera.

Currently, a large screen controls a camera to collect an image in the following manners:
1. An application enables or disables the camera (that is, controls the camera to lift or retract) through an Android (Android mobile phone operating system) native camera (camera) interface. The native camera interface may use a standard UVC (USB Video-Class, USB video specification) protocol.
2. The application enables or disables the camera (that is, controls the camera to lift or retract) through a high-speed interface that can adjust dynamic parameters of the camera and that is customized for the large screen. This interface can also use the UVC protocol, and the UVC protocol is extended.

In the conventional technology, different applications may control, through different interfaces or different modules, the camera to lift or retract. In a scenario of quickly switching between two applications that use the camera, the camera may be lifted and retracted repeatedly. For example, when an application A uses the camera to collect data, the user starts an application B, and the started application B also needs to use the camera to collect data. In this case, the application A first controls, through an interface or a module, the camera to retract, and then the application B controls, through another interface or another module, the camera to lift. As a result, the camera is lifted and retracted repeatedly.

SUMMARY

In view of this, embodiments of this application provide a camera control method and system, and an electronic device, to resolve a technical problem that a camera is repeatedly lifted and retracted in a scenario of quickly switching between a plurality of applications that use the camera in the conventional technology.

According to a first aspect, an embodiment of this application provides a camera control method, applied to an electronic device. The electronic device includes a display apparatus, a photographing apparatus, and a lifting apparatus configured to lift or retract the photographing apparatus, a persistent connection is maintained between the display apparatus and the photographing apparatus through a first channel, and the method includes: The photographing apparatus receives, through the first channel or a second channel, a first stream on instruction triggered by a first application, where the first application is an application running on the electronic device, the second channel is a channel between the display apparatus and the photographing apparatus, and the first stream on instruction is used to instruct the photographing apparatus to collect an image and output the collected image to the first application. After receiving the first stream on instruction, the photographing apparatus reports the first stream on state to a proxy module in the display apparatus through the first channel. The proxy module in the display apparatus controls, based on the first stream on state, the lifting apparatus to lift the photographing apparatus. After being lifted, the photographing apparatus starts to collect an image, and outputs the collected image to the first application through the second channel. When being lifted, the photographing apparatus is able to collect an image, and when being retracted, the photographing apparatus stops collecting an image.

In a possible implementation, after the photographing apparatus is lifted and starts to collect an image, the method further includes: The photographing apparatus receives, through the first channel or the second channel, a first stream off instruction triggered by the first application, where the first stream off instruction is used to instruct the photographing apparatus to stop collecting the image and stop outputting the collected image to the first application. After receiving the first stream off instruction, the photographing apparatus reports a first stream off state to the proxy module through the first channel. The proxy module controls the lifting apparatus to retract the photographing apparatus based on the first stream off state.

In a possible implementation, in a process in which the photographing apparatus is lifted and starts to collect an image, and outputs the collected image to the first application through the second channel, the method further includes: A second application that needs to use the photographing apparatus is started, where the second application is an application running on the electronic device. In response to starting the second application, the first application is closed or is switched to the background. The photographing apparatus receives, through the first channel or the second channel, the first stream off instruction triggered by the first application, where the first stream off instruction is used to instruct the photographing apparatus to stop collecting the image and stop outputting the collected image to the first application. After receiving the first stream off instruction, the photographing apparatus reports a first stream off state to the proxy module through the first channel. After receiving the first stream off instruction, the photographing apparatus receives, through the second channel within a preset redundancy time, a second stream on instruction triggered by the second application, where the second stream on instruction is used to instruct the photographing apparatus to collect an image and output the collected image to the second application. After receiving the second stream on instruction, the photographing apparatus reports a second stream on state to the proxy module through the first channel. If the proxy module determines that the first stream off state and the second stream on state are received successively within the preset redundancy time, the proxy module discards the first stream off state and the second stream on state, and the proxy module does not control, based on the first stream off state and the second stream on state, the lifting apparatus to lift or retract the photographing apparatus. The first application and the second application are non-background-resident applications, and the non-background-resident application is an application that uses the image collected by the photographing apparatus when running in the foreground and that does not use the image collected by the photographing apparatus when running in the background.

In a possible implementation, the first application is a background-resident application, and the background-resident application is an application that runs in the background of the electronic device and that uses an image collected by the photographing apparatus. When the background-resident application uses the image collected by the photographing apparatus, the collected image is not displayed on the display apparatus. The first stream on instruction includes an instruction used to instruct the photographing apparatus to collect an image and output the collected image to the first application, and an identifier used to indicate that the first application is a background-resident application. After the photographing apparatus is lifted and starts to collect an image, the method further includes: A second application that needs to use the photographing apparatus is started, where the second application is a non-background-resident application running on the electronic device. The photographing apparatus receives, through the second channel, a second stream on instruction triggered by the second application, where the second stream on instruction is used to instruct the photographing apparatus to start to collect an image and output the collected image to the second application. The photographing apparatus skips, according to the second stream on instruction based on the second stream on instruction and the identifier in the first stream on instruction, sending a stream on state to the proxy module. When the second application is closed or is switched to the background, the photographing apparatus receives, through the second channel, a second stream off instruction triggered by the second application, where the second stream off instruction is used to instruct the photographing apparatus to stop collecting an image and stop outputting the collected image to the second application. The photographing apparatus skips, according to the second stream off instruction based on the second stream off instruction and the identifier in the first stream on instruction, sending a stream off state to the proxy module. In a process from starting the second application to closing the second application or switching the second application to the background, the photographing apparatus outputs the collected image to the first application and the second application through the first channel.

In a possible implementation, the first channel uses a Remote Network Driver Interface Specification RNDIS protocol and the second channel uses a USB video class UVC protocol.

In a possible implementation, the persistent connection is a socket socket persistent connection established by using the RNDIS protocol.

In a possible implementation, the method further includes: If the persistent connection is interrupted, the persistent connection is re-established between the display apparatus and the photographing apparatus.

In a possible implementation, after the display apparatus is powered on, the persistent connection between the display apparatus and the photographing apparatus is established through the first channel.

In a possible implementation, after the display apparatus establishes the persistent connection to the photographing apparatus, the photographing apparatus reports a current stream on/off state to the proxy module through the first channel; and the proxy module controls, based on the stream on/off state, the photographing apparatus to lift or retract.

In a possible implementation, the electronic device is a large screen device or a smart television; the display apparatus includes a display screen and a controller; the photographing apparatus is a camera; or the lifting apparatus includes a motor.

According to a second aspect, an embodiment of this application provides an electronic device, including a display apparatus, a photographing apparatus, and a lifting apparatus configured to lift or retract the photographing apparatus, and a persistent connection is maintained between the display apparatus and the photographing apparatus through a first channel. The display apparatus, the photographing apparatus, and the lifting apparatus cooperate with each other, so that the electronic device performs the method according to the first aspect.

According to a third aspect, an embodiment of this application provides a camera control system. The apparatus includes a storage medium and a central processing unit, the storage medium may be a non-volatile storage medium, and the storage medium stores a computer executable program. The central processing unit is connected to the non-volatile storage medium, and executes the computer executable program to implement the method in the first aspect or any possible implementation of the first aspect.

According to a fourth aspect, an embodiment of this application provides a camera control system, and the apparatus is included in an electronic device. The apparatus has a function of implementing behavior of the electronic device in any method according to the first aspect and the possible designs. The function may be implemented by hardware, or may be implemented by hardware executing corresponding software. The hardware or the software includes at least one module or unit corresponding to the foregoing function.

According to a fifth aspect, this embodiment of this application provides a chip. The chip includes a processor and a data interface. The processor reads, through the data interface, instructions stored in a memory, to perform the method according to any one of the first aspect or the possible implementations of the first aspect.

Optionally, in an implementation, the chip may further include the memory. The memory stores instructions. The processor is configured to execute the instructions stored in the memory. When the instructions are executed, the processor is configured to perform the method according to any one of the first aspect or the possible implementations of the first aspect.

According to a sixth aspect, an embodiment of this application provides a computer-readable storage medium including program instructions. When the program instructions are run on a computer device, the computer device is enabled to perform the method described in any one of the first aspect or the possible implementations of the first aspect.

According to a seventh aspect, an embodiment of this application provides a computer program product. When the computer program product is run on a computer, the computer is enabled to perform the camera control method performed by the electronic device in any possible design of the foregoing aspects.

Compared with the conventional technology, the technical solutions have at least the following beneficial effects:

According to a camera control method and system, and an electronic device disclosed in embodiments of this application, lifting or retracting of a camera is associated with a stream on state of the camera, and there is no need to invoke a native camera interface of an operating system to control a motor to lift or lower, and an application does not need to have additional logic for invoking the motor, so that fewer modules are invoked for controlling lifting or retracting of the camera, and time sequence control is simpler. In addition, redundancy control logic used after the camera is disabled is added, so that a problem of repeatedly lifting and retracting the camera during switching between a plurality of applications can be avoided.

BRIEF DESCRIPTION OF DRAWINGS

FIG. 5A and FIG. 5B a schematic flowchart of a camera control method according to Embodiment 5 of this application.

REFERENCE NUMERALS

1—Display apparatus;
  11—Proxy module/cameraproxy module;
    111—Control unit;
    112—Transmitting unit;
    113—Receiving unit;
    114—Monitoring unit;
2—Photographing apparatus;
  21—Camera;
  22—Stream on/off detection module;
  23—Information sending module;
  24—Information receiving module;
3—Lifting apparatus;
  31—Motor; and
  32—Elevator.

DESCRIPTION OF EMBODIMENTS

Terms used in embodiments of this application are merely for the purpose of describing specific embodiments, but are not intended to limit this application. The terms "a", "said" and "the" of singular forms used in embodiments and the appended claims of this application are also intended to include plural forms, unless otherwise specified in the context clearly.

Embodiment 1

Figure 1:
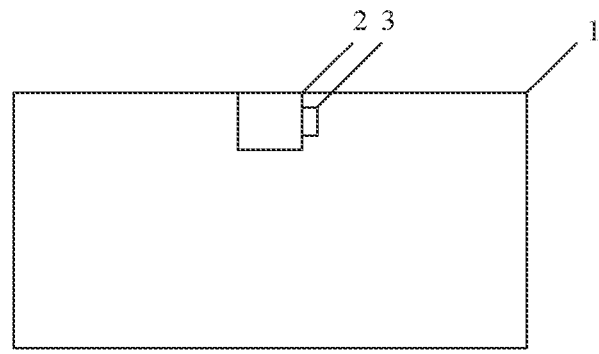
FIG. 1 is a schematic diagram of a structure of an electronic device according to Embodiment 1 of this application.
Figure 2:
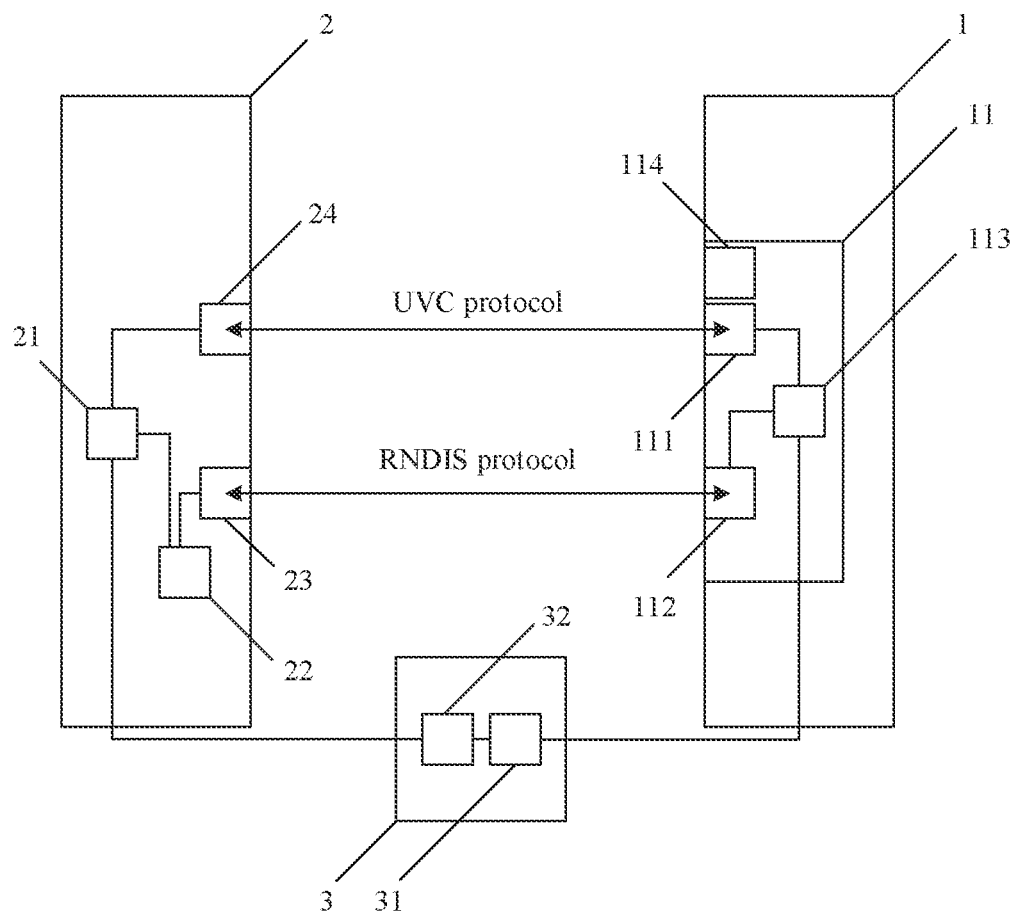
FIG. 2 is a schematic diagram of modules of a camera control system according to Embodiment 1 of this application.

As shown in FIG. 1 and FIG. 2. Embodiment 1 of this application discloses an electronic device. The electronic device includes a display apparatus 1, a photographing apparatus 2, and a lifting apparatus 3.

The display apparatus 1 has a proxy module 11, and the proxy module 11 is a cameraproxy module (camera proxy module) 11. The cameraproxy module 11 may include a control unit 111, a sending unit 112, a receiving unit 113, and a monitoring unit 114. The photographing apparatus 2 includes a camera 21, a stream on/off detection module 22, an information sending module 23, and an information receiving module 24. The lifting apparatus 3 includes an elevator 32 controlled by a motor 31.

The display apparatus 1 is connected to the photographing apparatus 2 through a USB (Universal Serial Bus, universal serial bus) cable. The photographing apparatus 2 is mechanically connected to the lifting apparatus 3.

From a perspective of camera controlling, the electronic device may include a camera control system. The camera control system may include the proxy module 11 located in the display apparatus 1, the stream on/off detection module 22, the information sending module 23 and the information receiving module 24 located in the photographing apparatus 2, and the motor 31 located in the lifting apparatus 3.

The display apparatus 1 may include an image display component such as a liquid crystal display, an LED screen (Light Emitting Diode, light emitting diode screen), and an AMOLED screen (Active Matrix/Organic Light Emitting Diode, active-matrix organic light emitting diode screen).

The control unit 111 communicates with the sending unit 112 and the receiving unit 113 separately. The control unit 111 may be integrated in the cameraproxy module 11, or may be an independent unit located outside the cameraproxy module 11. For ease of description and understanding, in this specification, an example in which the control unit 111 is integrated in the cameraproxy module 11 is used for description. A dual-protocol manner of a UVC protocol (USB video class, universal serial bus video class protocol, which is a standard protocol of a USB video capture device) and an RNDIS protocol (Remote Network Driver Interface Specification, Remote Network Driver Interface Specification Protocol) is used for communication between the information receiving module 24 in the photographing apparatus 2 and the sending unit 112 and communication between the information sending module 23 in the photographing apparatus 2 and the receiving unit 113. The UVC protocol and the RNDIS protocol are integrated in the cameraproxy module 11, which ensures that dual-driver is implemented between the cameraproxy module 11 of the display apparatus 1 and the camera 21 of the photographing apparatus 2 through dual-protocol communication. This compensates for a disadvantage of poor scalability of the UVC protocol. In this way, scalability of communication between the cameraproxy module 11 and the camera 21 is improved, and various types of messages may be transmitted between the cameraproxy module 11 and the camera 21. The RNDIS is TCP/IP (Transmission Control Protocol/Internet Protocol, Transmission Control Protocol/Internet Protocol) over USB, that is, TCP/IP runs on a USB device, so that the USB device looks like a network adapter. In this way, the cameraproxy module 11 can communicate with the camera 21 by using the TCP/IP protocol through simple socket programming. In this case, a socket channel is an implementation of the RNDIS protocol in Embodiment 1.

The monitoring unit 114 is configured to monitor whether the connection between the cameraproxy module 11 and the camera 21 is connected.

The camera 21 in the photographing apparatus 2 may be an image capture component such as a camera or a scanner. The camera 21 communicates with the information receiving module 24, and the information receiving module 24 sends a received stream on instruction or stream off instruction to the camera 21. The camera 21 performs stream-on or stream-off based on the instruction. The stream on/off detection module 22 is configured to monitor a stream on/off state of the camera 21. The stream on/off detection module 22 communicates with the information sending module 23, and is configured to send a stream on state or a stream off state of the camera 21 to the information sending module 23. The information sending module 23 sends the stream on state or the stream off state of the camera 21 to the receiving unit 113 in the cameraproxy module 11. The receiving unit 113 sends the stream on state or the stream off state of the camera 21 to the control unit 111, and the control unit 111 controls, based on the stream on state or the stream off state, the motor 31 to lift or lower.

In the electronic device in Embodiment 1 of this application, when the electronic device is turned on, the display apparatus 1 is powered on, a process of the cameraproxy module 11 is started, and a persistent connection is established between the cameraproxy module 11 and the camera 21 through a socket channel. For example, the cameraproxy module 11 is connected, through the socket channel, to a status synchronization interface specified by the camera 21, so as to establish the persistent connection. After the cameraproxy module 11 is connected to the camera 21 for the first time, the camera 21 reports the stream on state or the stream off state to the cameraproxy module 11, and the cameraproxy module 11 may invoke a lifting component interface based on the stream on state or the stream off state reported by the camera 21 to control the elevator 32 to lift or lower. The first time connection is a connection established between the cameraproxy module 11 and the camera 21 when the display apparatus 1 is turned on for the first time, and a connection established when the cameraproxy module 11 or the camera 21 is reconnected after being disconnected due to an exception in operation. In the two cases, especially in the second case of reconnection after disconnection, the camera 21 may be performing stream on before the disconnection. In this case, the camera 21 needs to report the stream on state or the stream off state to the cameraproxy module 11, to ensure that the state of the camera 21 that exists when the cameraproxy module 11 is connected to the camera 21 for the first time is reset.

To prevent an exception in the connection between the cameraproxy module 11 and the photographing apparatus 2, reliability of a socket channel needs to be ensured by using a keepalive mechanism. The keepalive mechanism means that the monitoring unit 114 in the cameraproxy module 11 monitors, in real time, whether a connection is connected, and reconnection is performed once a connection exception is found, to ensure stability of the socket channel.

After the persistent connection is established between the cameraproxy module 11 and the camera 21, the cameraproxy module 11 is to control, based on the stream on/off state of the camera 21, the motor 31 to lift or lower.

When the electronic device needs to collect an image by using the camera, the cameraproxy module 11 or another module sends a stream on instruction to the information receiving module 24 in the photographing apparatus 2 through a UVC channel or the socket channel. The information receiving module 24 notifies the camera 21 of the stream on instruction, and the camera 21 performs video stream-on. Then, the stream on/off detection module 22 detects that the camera 21 is performing stream-on, and sends the stream on state of the camera 21 to the information sending module 23. The information sending module 23 sends the stream on state to the receiving unit 113 in the cameraproxy module 11 through the socket channel (socket persistent connection). The receiving unit 113 sends the stream on state of the camera 21 to the control unit 111, and the control unit 111 controls, based on the stream on state, the motor 31 to run the elevator 32, so as to lift the camera 21. When the electronic device does not need to collect an image, the cameraproxy module 11 or another module sends a stream off instruction to the information receiving module 24 in the photographing apparatus 2 through the UVC channel or the socket channel. The information receiving module 24 notifies the camera 21 of the stream off instruction, and the camera 21 performs video stream-off. Then, the stream on/off detection module 22 detects that the camera 21 is performing stream-off, and sends the stream off state of the camera 21 to the information sending module 23. The information sending module 23 sends the stream off state to the receiving unit 113 in the cameraproxy module 11 through the socket channel. The receiving unit 113 sends the stream off state of the camera 21 to the control unit 111, and the control unit 111 controls, based on the stream on state, the motor 31 to run the elevator 32, so as to retract the camera 21.

According to the electronic device in Embodiment 1 of this application, through the two times of communication between the cameraproxy module 11 and the photographing apparatus 2, lifting or lowering of the motor 31 is controlled after the camera 21 performs video stream-on or stream-off, and the lifting or lowering of the motor 31 is determined based on the stream on state or the stream off state of the camera 21. This is different from a method used when a conventional electronic device needs to invoke a camera interface (a camera interface) in an operating system when invoking the motor 31 to lift or retract the photographing apparatus 2. In the electronic device according to Embodiment 1 of this application, a native camera interface module, an extended interface module, or another module that controls stream-on or stream-off of the camera may be only responsible for controlling stream-on or stream-off of the camera, and does not need to monitor motor lifting or lowering logic. Instead, a module (for example, the stream on/off detection module 22) in the photographing apparatus 2 is used to monitor video stream-on or stream-off of the camera 21, to uniformly control the motor 31 to lift or lower. That is, the lifting or lowering of the motor 31 is associated with the video stream-on or stream-off of the camera 21. This simplifies time sequence control logic.

In a scenario of quickly switching between a plurality of applications, that is, in a scenario in which an application A is started and is using the camera 21 and a user starts (for example, through voice control) an application B and the application B is to use the camera 21, redundancy control logic may be added to the cameraproxy module 11 or the photographing apparatus 2, and a time redundancy is set. The time redundancy may be adjusted based on an actual requirement, for example, is set to 500 ms. If the time redundancy is added to the cameraproxy module 11, within the time redundancy range, if the cameraproxy module 11 successively receives a stream off message and a stream on message, to be specific, if the cameraproxy module 11 receives the stream off message and then receives the stream on message within 500 ms, the cameraproxy module 11 does not control, based on the stream off message and the stream on message, the motor 3 to lower and then lift, but keeps the motor lifted. In specific implementation, the cameraproxy module may discard the stream off message and the stream on message that are within a range of the time redundancy. If the time redundancy is added to the photographing apparatus 2, within the time redundancy range, if the stream on/off detection module 22 successively detects that the camera 21 performs stream-off and stream-on, and the stream on/off detection module 22 determines that the camera 21 is still in the stream on state, the stream off state and the stream on state of the camera 21 are not reported to the cameraproxy module 11 successively.

In a scenario in which a foreground non-resident application uses the camera 21 when a background-resident application is using the camera 21, when the user opens the foreground non-resident application, the camera 21 is lifted. Due to the redundancy control, the camera 21 keeps lifted. When the user closes the foreground non-resident application, if no background-resident application uses the camera 21, the camera 21 reports, to the cameraproxy module 11, that the camera 21 is in the stream off state. When the user closes the foreground non-resident application, if the background resident application still uses the camera 21, the camera 21 determines that the camera 21 is still in the stream on state. In this case, the camera 21 does not report the stream off state to the cameraproxy, and therefore the camera 21 is not retracted. In this case, the monitoring unit 114 in the display apparatus 1 may be used to monitor whether another background-resident application needs to use the camera 21 after the current foreground non-resident application is closed. If there is another background-resident application needs to use the camera 21, the camera 21 does not report the stream on state to the cameraproxy module 11. The cameraproxy module 11 does not need to control the motor 31 to lift again. Alternatively, when the background-resident application starts to use the camera, a stream on control command received by the camera carries an identifier of the background-resident application, and the camera performs stream-off only when the camera receives a stream off control command that carries the identifier of the background-resident application. In other cases, the camera keeps being in the stream on state. In this embodiment of this application, the background-resident application using the camera means that the application runs in the background and needs to collect a video stream by using the camera, while the video stream may not be displayed on the display interface.

According to the electronic device in Embodiment 1 of this application, there is no need to invoke the native camera interface of an operating system, or write logic for invoking the camera interface to control the lifting of the motor 31 into time sequence control. Instead, the stream on/off state of the camera 21 is associated with the lifting or lowering of the motor 31. This reduces modules for invoking the motor 31 to lift or lower, and simplifies time sequence control. In addition, in a scenario of quickly switching between a plurality of applications, the motor 31 does not repeatedly lift and lower, and in a scenario in which the foreground application and the background application alternately use the camera 21, the lifting or lowering of the motor 31 does not disorder.

In the large-screen device provided in this embodiment of this application, the display apparatus is connected to the camera (photographing apparatus) over USB. Two virtual transmission protocol channels, for example, a first transmission protocol channel and a second transmission protocol channel, are established between the display apparatus and the camera, and are used to transmit data of different types or different content.

The first transmission protocol channel may be, for example, a remote network driver interface specification (remote network driver interface specification, RNDIS) channel, used to transmit non-video data. RNDIS is a communication protocol, and can implement an Ethernet connection such as a TCP/IP protocol suite (TCP/IP protocol suite) connection over USB. According to the TCP/IP protocol, the RNDIS can use a socket programming interface. By taking advantages such as lightweight and good portability of the socket programming interface, the RNDIS may provide a reliable, stable, and efficient transmission capability between the display apparatus and the camera. This is suitable for transmission of non-video data. For example, in this embodiment of this application, the camera may report the stream on/off state to the cameraproxy through the RNDIS channel (socket channel), or some applications may send the stream on/off instruction to the camera through the RNDIS channel.

The second transmission protocol channel may be, for example, a USB video class (USB video class, UVC) channel, used to transmit video data, or may be used to transmit a stream on/off instruction sent by each application to the camera through an interface. UVC is a video transmission protocol standard that enables a camera to connect to a display apparatus and transmit videos without installing any driver. The image data collected by the camera is transmitted to the display apparatus through the UVC channel.

Embodiment 2

This embodiment of this application discloses a camera control method. The display apparatus 1, the photographing apparatus 2, the lifting apparatus 3, and the camera control system including a plurality of modules in the three apparatuses in the electronic device disclosed in Embodiment 1 of this application are used to perform the camera control method in Embodiment 2 of this application.

The camera control method is applied to the electronic device. In the electronic device, the display apparatus 1 is configured to display an image, the photographing apparatus 2 is configured to capture an image by using the camera 21, and the lifting apparatus 3 is configured to lift or retract the photographing apparatus 2. A persistent connection is maintained between the display apparatus 1 and the photographing apparatus 2 through a first channel, and the method includes: The photographing apparatus 2 receives a first stream on instruction triggered by a first application through the first channel or a second channel, where the first application is an application running on the electronic device, the second channel is a channel between the display apparatus 1 and the photographing apparatus 2, and the first stream on instruction is used to instruct the photographing apparatus 2 to collect an image and output the collected image to the first application. After receiving the first stream on instruction, the photographing apparatus 2 reports a first stream on state to the proxy module 11 in the display apparatus 1 through the first channel. The proxy module 11 in the display apparatus 1 controls the lifting apparatus 3 to lift the photographing apparatus 2 based on the first stream on state. After being lifted, the photographing apparatus 2 starts to collect an image, and outputs the collected image to the first application through the second channel. When being lifted, the photographing apparatus 2 is able to collect an image; and when being retracted, the photographing apparatus 2 stops collecting an image.

After the photographing apparatus 2 is lifted and starts to collect an image, the method further includes: The photographing apparatus 2 receives, through the first channel or the second channel, a first stream off instruction triggered by the first application, where the first stream off instruction is used to instruct the photographing apparatus 2 to stop collecting the image and stop outputting the collected image to the first application. After receiving the first stream off instruction, the photographing apparatus 2 reports a first stream off state to the proxy module 11 through the first channel. The proxy module 11 controls the lifting apparatus 3 to retract the photographing apparatus 2 based on the first stream off state.

In a process in which the photographing apparatus 2 is lifted and starts to collect an image, and outputs the collected image to the first application through the second channel, the method further includes the following steps: A second application that needs to use the photographing apparatus 2 is started, where the second application is an application running on the electronic device. In response to starting the second application, the first application is closed or is switched to the background. The photographing apparatus 2 receives, through the first channel or the second channel, the first stream off instruction triggered by the first application, where the first stream off instruction is used to instruct the photographing apparatus 2 to stop collecting the image and stop outputting the collected image to the first application. After receiving the first stream off instruction, the photographing apparatus 2 reports a first stream off state to the proxy module 11 through the first channel. After receiving the first stream off instruction, the photographing apparatus 2 receives, through the second channel within a preset redundancy time, a second stream on instruction triggered by the second application, where the second stream on instruction is used to instruct the photographing apparatus 2 to collect an image and output the collected image to the second application. After receiving the second stream on instruction, the photographing apparatus 2 reports a second stream on state to the proxy module 11 through the first channel. If the proxy module 11 determines that the first stream off state and the second stream on state are received successively within the preset redundancy time, the proxy module 11 discards the first stream off state and the second stream on state, and the proxy module 11 does not control the lifting apparatus 3 to lift or retract the photographing apparatus 2 based on the first stream off state and the second stream on state. The first application and the second application are non-background-resident applications, the non-background-resident application is an application that uses the image collected by the photographing apparatus 2 when running in the foreground, and that does not use the image collected by the photographing apparatus 2 when running in the background.

The first application is a background-resident application, and the background-resident application is an application that runs in the background of the electronic device and that uses the image collected by the photographing apparatus 2. When the background-resident application uses the image collected by the photographing apparatus 2, the collected image is not displayed on the display apparatus 1. The first stream on instruction includes an instruction used to instruct the photographing apparatus 2 to collect an image and output the collected image to the first application, and an identifier used to indicate that the first application is a background-resident application. After the photographing apparatus 2 is lifted and starts to collect an image, the method further includes: A second application that needs to use the photographing apparatus 2 is started, where the second application is a non-background-resident application running on the electronic device. The photographing apparatus 2 receives, through the second channel, a second stream on instruction triggered by the second application, where the second stream on instruction is used to instruct the photographing apparatus 2 to start to collect an image and output the collected image to the second application. The photographing apparatus 2 skips, according to the second stream on instruction based on the second stream on instruction and the identifier in the first stream on instruction, sending a stream on state to the proxy module 11. When the second application is closed or is switched to the background, the photographing apparatus 2 receives, through the second channel, a second stream off instruction triggered by the second application, where the second stream off instruction is used to instruct the photographing apparatus 2 to stop collecting an image and stop outputting the collected image to the second application. The photographing apparatus 2 skips, according to the second stream off instruction based on the second stream off instruction and the identifier in the first stream on instruction, sending a stream off state to the proxy module 11. In a process from starting the second application to closing the second application or switching the second application to the background, the photographing apparatus 2 outputs the collected image to the first application and the second application through the first channel.

In the method disclosed in this embodiment of this application, the first channel uses a Remote Network Driver Interface Specification RNDIS protocol and the second channel uses a USB video class UVC protocol.

In the method disclosed in this embodiment of this application, the persistent connection is a socket persistent connection established by using the RNDIS protocol. To ensure stability of the persistent connection between the display apparatus 1 and the photographing apparatus 2, a keepalive mechanism is introduced in the method. To be specific, a connection status between the display apparatus 1 and the photographing apparatus 2 is monitored in real time. If the persistent connection is interrupted, the persistent connection is re-established between the display apparatus 1 and the photographing apparatus 2.

In the method disclosed in this embodiment of this application, after the display, apparatus 1 is powered on, the persistent connection is established between the display apparatus 1 and the photographing apparatus 2 through the first channel. After the display apparatus 1 establishes the persistent connection to the photographing apparatus 2, the photographing apparatus 2 reports a current stream on/off state to the proxy module 11 through the first channel, and the proxy module 11 controls lifting or retracting of the photographing apparatus 2 based on the stream on/off state.

In the method disclosed in this embodiment of this application, the electronic device is a large screen device or a smart television; the display apparatus 1 includes a display screen and a controller; the photographing apparatus 2 is the camera 21; or the lifting apparatus 3 includes the motor 31.

Embodiment 3

Figure 3A:
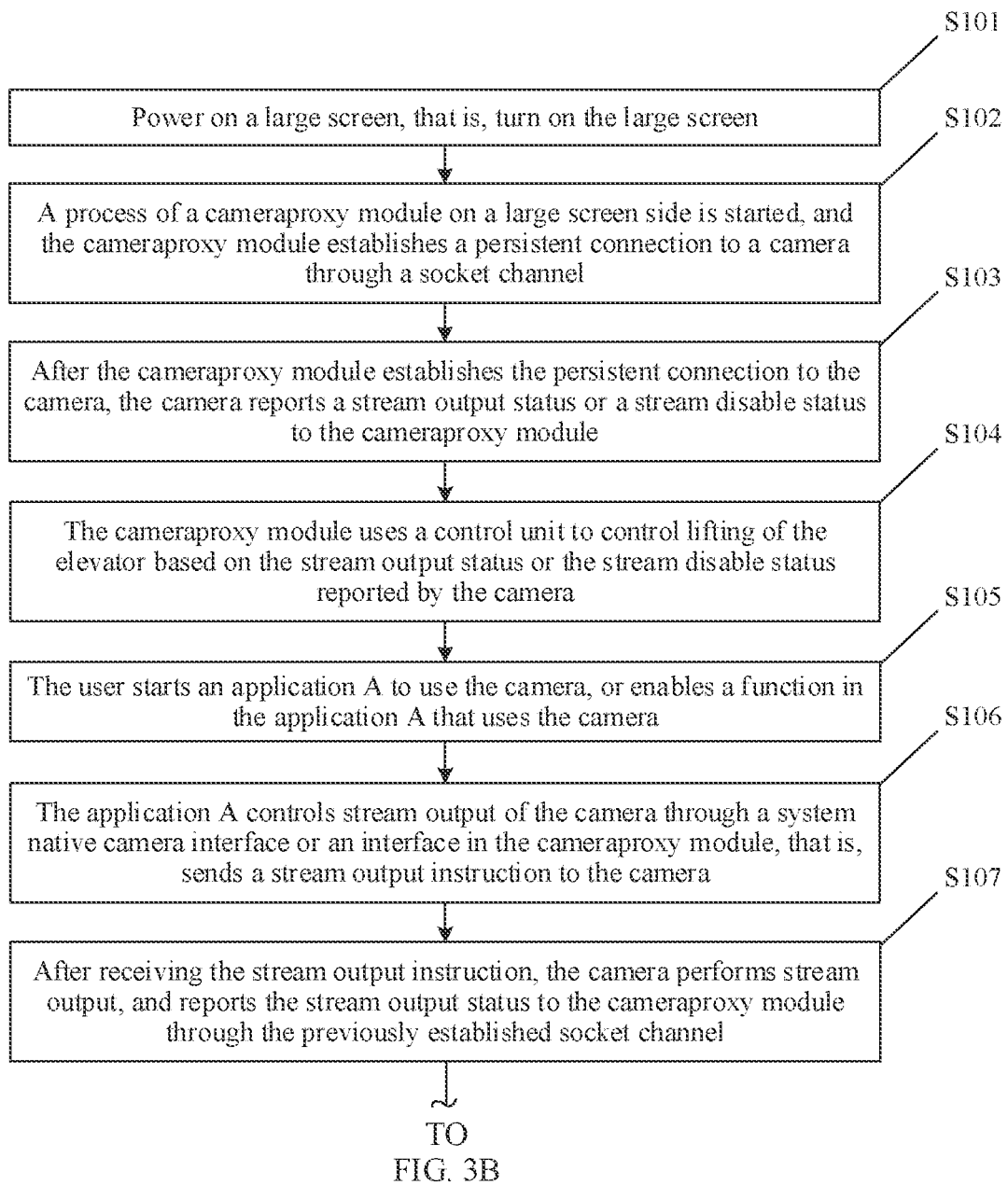
FIG. 3A and FIG. 3B are a schematic flowchart of a camera control method according to Embodiment 3 of this application.
Figure 3B:
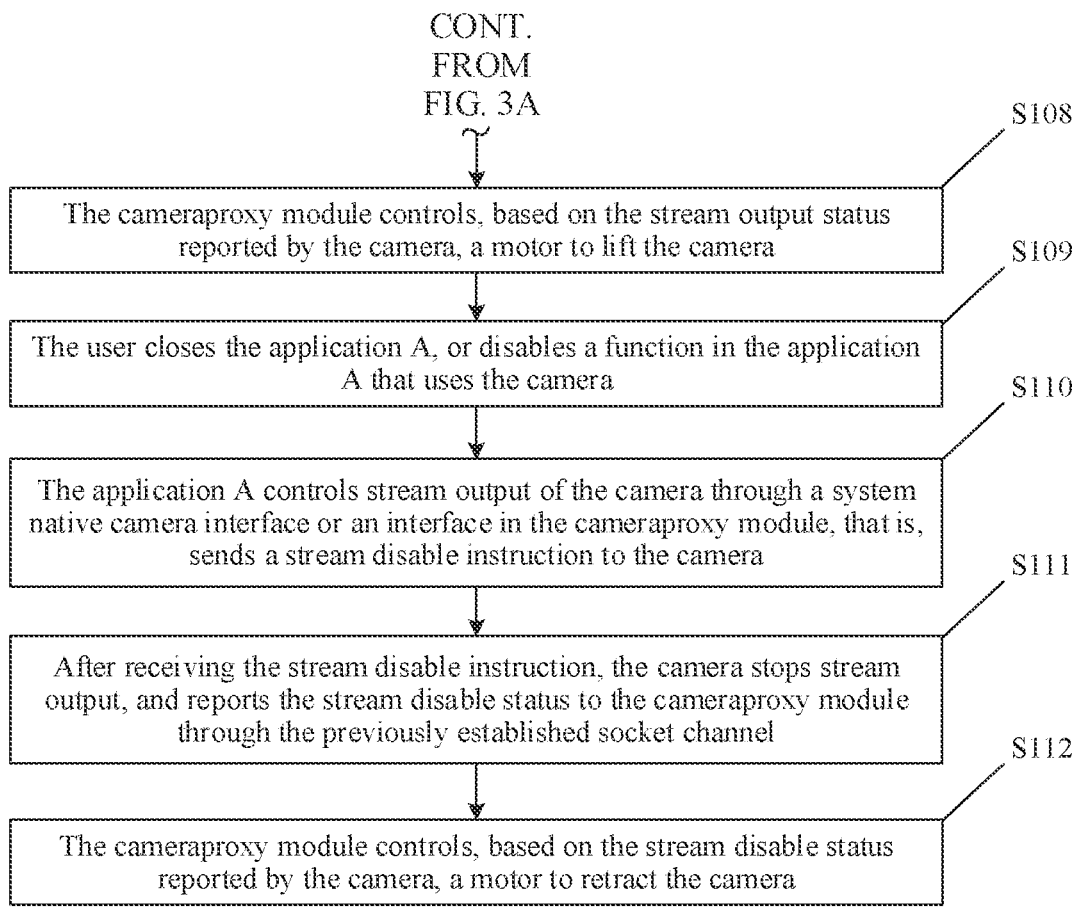

As shown in FIG. 3A and FIG. 3B, this embodiment of this application discloses a camera control method. The display apparatus 1, the photographing apparatus 2, the lifting apparatus 3, and the camera control system including a plurality of modules in the three apparatuses in the electronic device disclosed in Embodiment 1 of this application are used to perform the camera control method in Embodiment 3 of this application.

The camera control method mainly determines to control, based on a stream on state or a stream off state of a camera, lifting or retracting of the motor, and the method is specifically implemented in the following steps.

S101: Power on a large screen, that is, turn on the large screen.

S102: A process of a cameraproxy module on a large screen side is started, and the cameraproxy module establishes a persistent connection to the camera through a socket channel.

S103: After the cameraproxy module establishes the persistent connection to the camera, the camera reports a stream on state or a stream off state to the cameraproxy module.

S104: The cameraproxy module uses a control unit to control lifting or lowering of an elevator based on the stream on state or the stream off state reported by the camera. The stream on state indicates that the camera is in a state of capturing and outputting an image, and the stream off state indicates that the camera is in a state of neither capturing nor outputting an image. If the camera reports the stream on state, the cameraproxy module invokes an interface to control the elevator to lift. If the camera reports the stream off state, the cameraproxy module invokes the interface to control the elevator to lower. It should be noted that, if the camera is originally in a retracted state, when the cameraproxy module controls, through the interface, the elevator to lower, the camera does not move. If the camera is originally in a lifted state, when the cameraproxy module controls, through the interface, the elevator to lower, the camera does not move. Usually, when the large screen is turned on, the camera is in the stream off state.

The persistent connection between the cameraproxy module and the camera needs to be kept alive. If the persistent connection is disconnected, the persistent connection needs to be re-established. After the persistent connection is re-established, S103 and S104 need to be further performed.

After S104, lifting or retracting of the camera may be controlled based on a user usage.

S105: A user starts an application A to use the camera, or enables a function that uses the camera in the application A.

S106: The application A controls stream-on of the camera through a system native camera interface or an interface in the cameraproxy module, that is, sends a stream on instruction to the camera. The stream on instruction may be sent according to the UVC protocol.

It should be noted that when an application needs to use the camera to collect data, the application sends the stream on instruction to the camera, to instruct the camera to collect an image and report collected data to the application. When an application no longer uses the camera, the application sends a stream off instruction to the camera, to instruct the camera to stop sending image data to the application.

S107: After receiving the stream on instruction, the camera performs stream-on, and reports the stream on state to the cameraproxy module through the previously established socket channel.

S108: The cameraproxy module controls, based on the stream on state reported by the camera, the motor to lift the camera.

S109: The user closes the application A, or disables the function that uses the camera in the application A.

S110: The application A controls stream-on of the camera through the system native camera interface or the interface in the cameraproxy module, that is, sends a stream off instruction to the camera. The stream off instruction may be sent according to the UVC protocol.

S111: After receiving the stream off instruction, the camera stops stream-on, and reports the stream off state to the cameraproxy module through the previously established socket channel.

S112: The cameraproxy module controls, based on the stream off state reported by the camera, the motor to retract the camera.

In this embodiment of this application, the persistent connection is established between the camera and the cameraproxy module on the large screen side through the socket channel. When a stream on/off state of the camera changes, the camera notifies the cameraproxy module through the socket channel. The cameraproxy module invokes, based on the stream on/off state, an interface provided by the lifting component, and uses the control unit to control the motor to lift or lower, so as to accurately control the camera to lift or retract. This reduces modules that invoke the lifting of the motor, and simplifies time sequence control logic. In the conventional technology, when using a camera, different applications may use different modules or processes to control enabling or disabling of the camera, and use the different modules or processes to separately control lifting or retracting of the camera. Consequently, time sequence control logic for lifting or retracting the camera is complex. In this embodiment of this application, although different modules or processes may be used to control enabling or disabling (that is, stream on or stream disabling) of the camera, a same module is used to control lifting or retracting of the camera based on the stream on/off state of the camera. In this way, control logic for lifting or retracting the camera is simple.

Embodiment 4

Figure 4A:
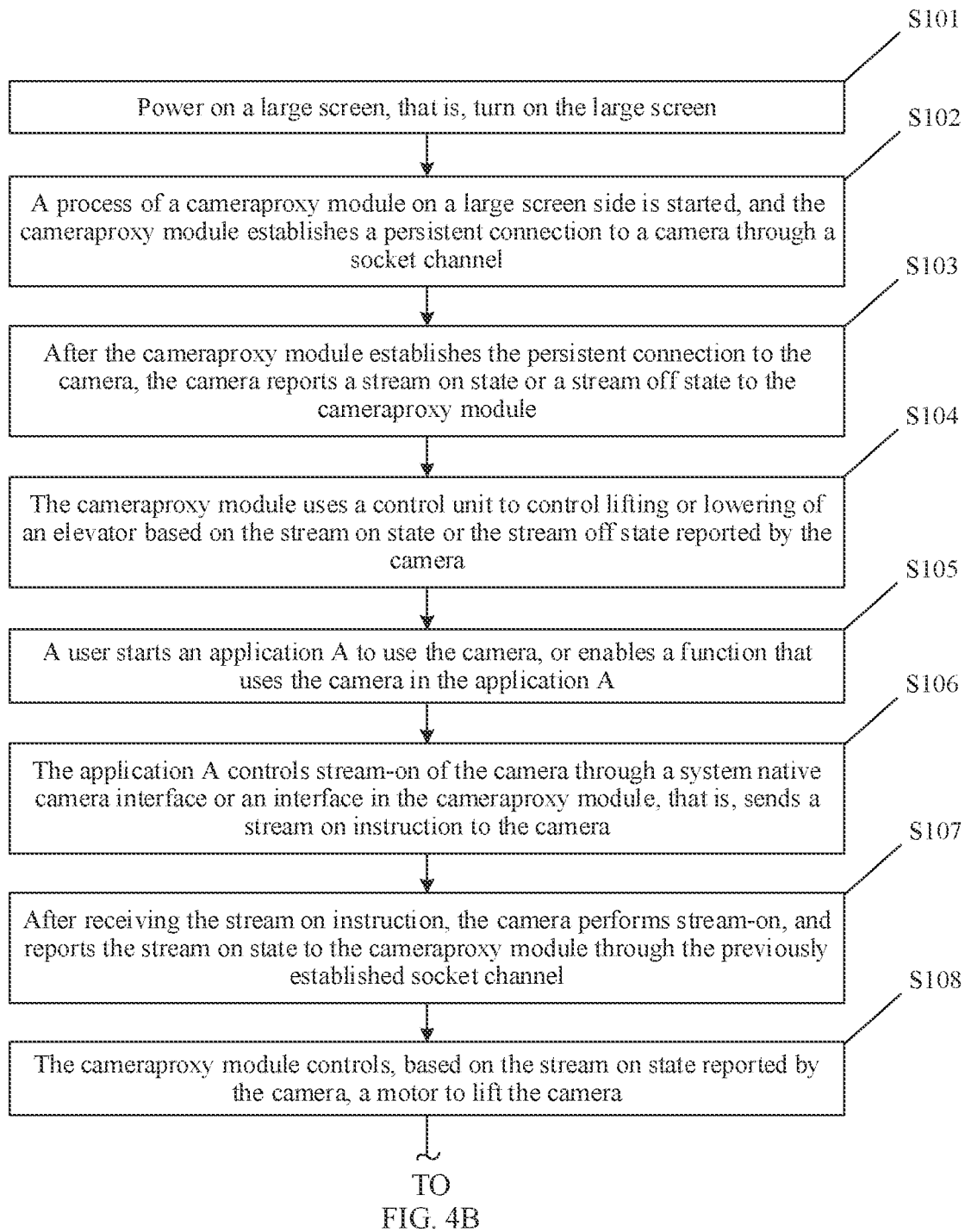
FIG. 4A and FIG. 4B are a schematic flowchart of a camera control method according to Embodiment 4 of this application.
Figure 4B:
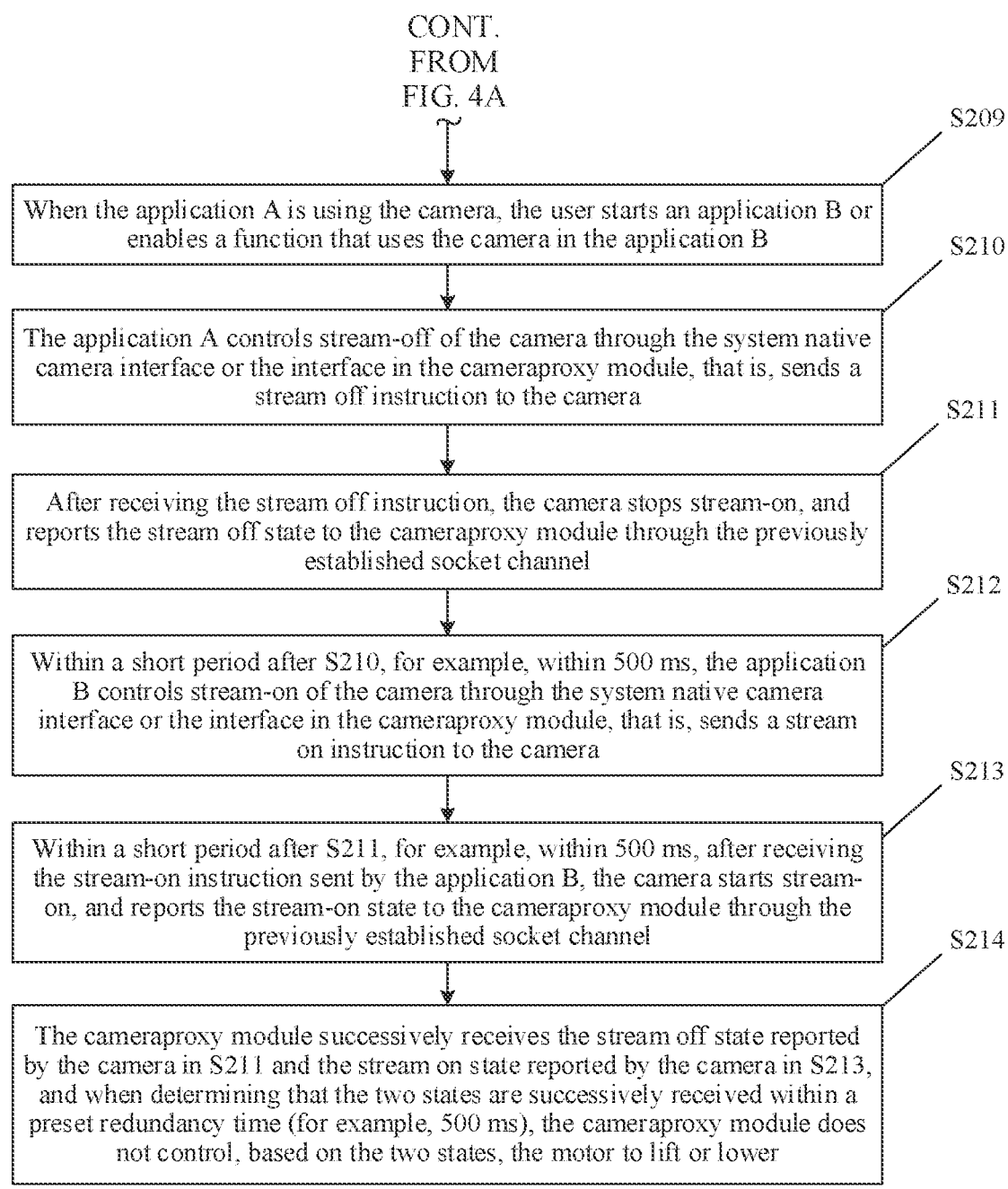

As shown in FIG. 4A and FIG. 4B, this embodiment of this application discloses a camera control method. Similar to the embodiment shown in FIG. 3A and FIG. 3B, the camera control method is also implemented by using a cameraproxy module in a camera control system to control a display apparatus, a photographing apparatus, and a lifting apparatus.

However, a difference from the method in the embodiment shown in FIG. 3A and FIG. 3B is that this embodiment of this application can further resolve a problem that the photographing apparatus is lifted and retracted repeatedly in a scenario of directly and quickly switching between two third-party applications that use the photographing apparatus (for example, when an application A is started, an application B is woken up by a voice) in the conventional technology.

As shown in FIG. 4A and FIG. 4B, the method provided in this embodiment of this application includes the following steps.

S101 to S108: For details about these steps, refer to the description in the embodiment shown in FIG. 3A and FIG. 3B.

S209: When the application A is using the camera, the user starts the application B or enables a function that uses the camera in the application B.

That is, in the scenario of quickly switching applications, for example, when the application A is using the camera, the user may start the application B by pressing a key, by voice, or in another manner.

S210: The application A controls stream-off of the camera through the system native camera interface or the interface in the cameraproxy module, that is, sends a stream off instruction to the camera. The stream off instruction may be sent according to the UVC protocol.

Because the application B is started, the application A is switched to the background or the application A is closed. In this case, the application A needs to send the stream off instruction to the camera. That is, the application A no longer uses the camera.

S211: After receiving the stream off instruction, the camera stops stream-on, and reports the stream off state to the cameraproxy module through the previously established socket channel.

S212: Within a short period after S210, for example, within 500 ms, the application B controls stream-on of the camera through the system native camera interface or the interface in the cameraproxy module, that is, sends a stream on instruction to the camera. The stream on instruction may be sent according to the UVC protocol.

S213: Within a short period after S211, for example, within 500 ms, after receiving the stream on instruction sent by the application B, the camera starts stream-on, and reports the stream on state to the cameraproxy module through the previously established socket channel.

S214: The cameraproxy module successively receives the stream off state reported by the camera in S211 and the stream on state reported by the camera in S213. When determining that the two states are successively received within a preset redundancy time (for example, 500 ms), the cameraproxy module does not control, based on the two states, the motor to lift or lower.

That is, when the cameraproxy module determines that the stream off state and the stream on state are successively received within the redundancy time, the cameraproxy module does not control the motor to lift or lower, but keeps the camera lifted. This can avoid repeated lifting and retracting of the camera.

To be specific, the cameraproxy module has a redundancy control logic. When receiving a stream on message (the stream on state) within 500 ms (the time can be adjusted) after receiving a stream off message (the stream off state), the cameraproxy module does not invoke a lifting component interface or control the motor to lift or lower.

In an alternative implementation solution, the redundancy control logic in S214 may also be configured in the camera. If the camera receives the stream off and stream on commands within a short period (redundancy time), the camera does not need to report the stream off state to the cameraproxy module. In this case, the cameraproxy module does not control the motor to lift or control. To be specific, S211 to S214 may be replaced by S211': After receiving the stream off instruction triggered by the application A, the camera does not report the stream off state to the cameraproxy module. Instead, the camera waits for a redundancy time (for example, 500 ms). If the stream on instruction triggered by the application B is received within the redundancy time, the camera keeps stream-on and does not report the stream off state and stream on state to the cameraproxy module.

In this embodiment of this application, it can be ensured that in a scenario of quickly switching between applications, the camera can be accurately controlled to lift or retract. This reduces modules used for invoking the motor to lift or lower, simplifies the time sequence control logic, and solves a problem that the camera is repeatedly lifted and retracted.

Embodiment 5

Figure 5A:
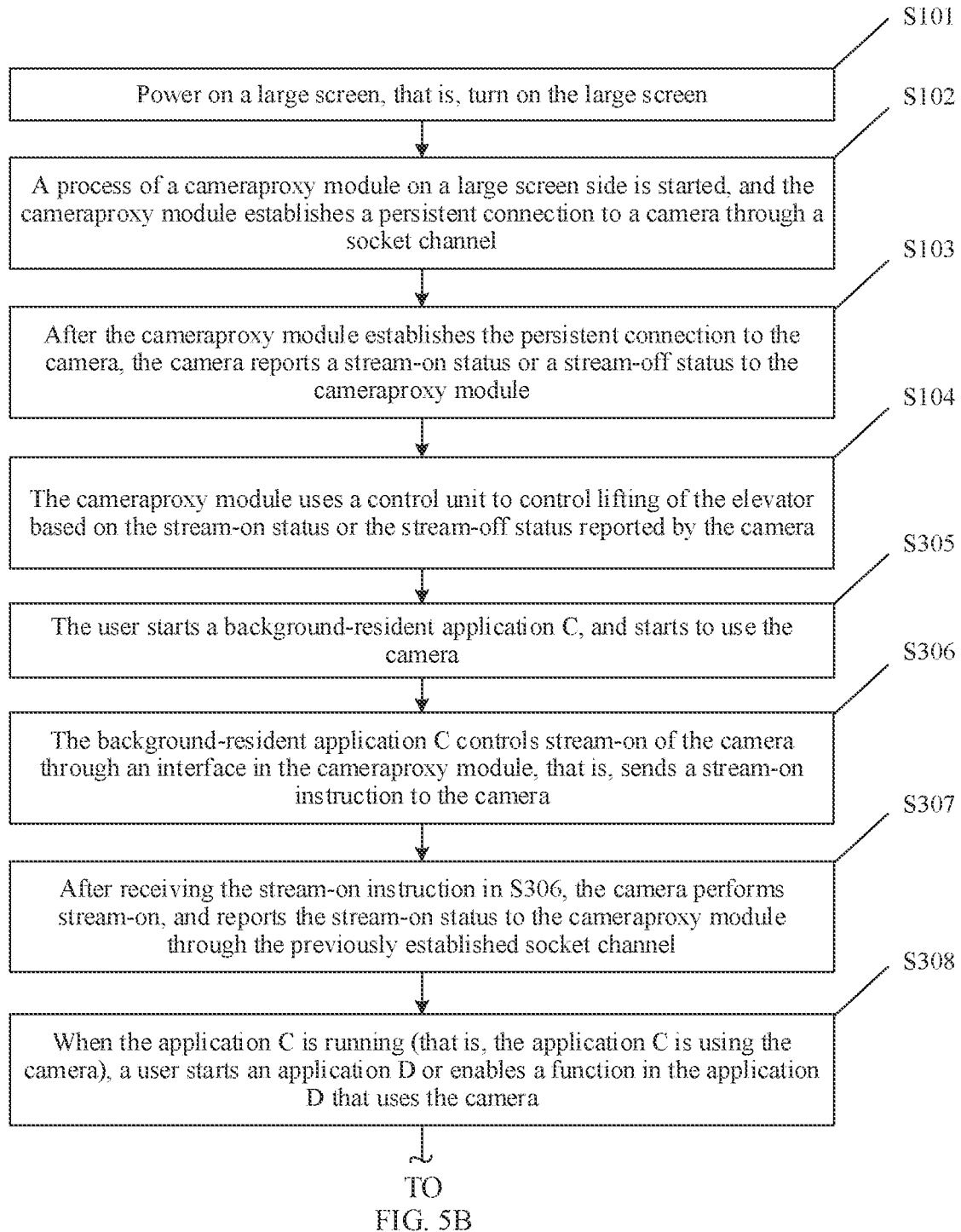

As shown in FIG. 5A and FIG. 5B, this embodiment of this application discloses a camera control method. Similar to the embodiment shown in FIG. 3A and FIG. 3B, the camera control method is also implemented by using a cameraproxy module in a camera control system to control a display apparatus, a photographing apparatus, and a lifting apparatus.

A difference from the embodiment shown in FIG. 3A and FIG. 3B is that this embodiment of this application can further resolve a problem that when a background-resident application and a foreground application use a camera, lifting or lowering of a motor may disorder in the conventional technology. In the conventional technology, when a background-resident application is started and uses the camera for stream-on, if a user starts a foreground application, the foreground application controls the camera to retract when the user closes the foreground application. Therefore, the background-resident application cannot continue to use the camera.

The background-resident application such as a gesture recognition application actually does not need the camera to transmit a video to a main board for displaying in the foreground, but only needs the camera to collect an image for processing such as gesture recognition. In this case, although the background application enables the camera, the foreground application such as home camera and video call can still use the camera. A foreground application using a camera means that, when the foreground application uses the camera, the application occupies the foreground interface for video stream display. When the application is closed, the interface disappears and the camera is no longer used.

A specific application of the method in this embodiment of this application is in a case in which the foreground application is normally used when the background-resident application is started. An operation process in this case is as follows, and this process mainly resolves a problem that the lifting or lowering of the motor disorders. As shown in FIG. 5A and FIG. 5B, the method provided in this embodiment of this application includes:

S101 to S104: For details about these steps, refer to the description in the embodiment shown in FIG. 3A and FIG. 3B.

S305: The user starts a background-resident application C, and starts to use the camera.

S306: The background-resident application C controls stream-on of the camera through an interface in the cameraproxy module, that is, sends a stream on instruction to the camera. The stream on instruction may be sent according to a UVC protocol, or may be sent through a socket channel.

The stream on instruction includes an instruction that instructs the camera to start stream-on and an identifier that indicates that the application C is a background-resident application.

S307: After receiving the stream on instruction in S306, the camera starts stream-on, and reports the stream on state to the cameraproxy module through the previously established. socket channel.

Because the application C is a background-resident application, an image collected by the camera does not need to be displayed on a display interface of a large screen.

S308: When the application C is running (that is, the application C is using the camera), the user starts an application D or enables a function that uses the camera in the application D.

S309: The application D controls stream-on of the camera through a system native camera interface or an interface in the cameraproxy module, that is, sends a stream on instruction to the camera. The stream on instruction may be sent according to the UVC protocol.

S310: After receiving the stream on instruction sent by the application D, the camera starts to send the collected image to the application D. It should be noted that, when receiving the stream on instruction sent by the application D, the camera is already in the stream on state. Therefore, the camera may not report the stream on state to the cameraproxy module.

Because the application C is a background-resident application, when the application D is started and uses the camera, the application C also uses data of the camera. Therefore, the application C does not need to send a stream off instruction to the camera when the application D is started.

S311: The user closes the application D, or disables the function that uses the camera in the application D.

S312: The application D controls stream-off of the camera through the system native camera interface or the interface in the cameraproxy module, that is, sends a stream off instruction to the camera.

S313: After receiving the stream off instruction sent by the application D, the camera stops sending the collected image to the application D. In addition, the camera determines that the application C still uses the camera, that is, the camera does not receive the stream off instruction (the identifier of the background-resident application may be carried) sent by the application C. In this case, the camera does not report the stream off state to the cameraproxy module.

Therefore, the cameraproxy module does not control the camera to retract because the application D is closed.

After S313, if the camera receives the stream off instruction sent by the application C, the camera reports the stream off state to the cameraproxy module through the socket channel, so that the cameraproxy module controls the camera to retract.

Embodiment 6

Embodiment 6 of this application further provides a chip, including a processor and a data interface. The processor reads, through the data interface, instructions stored in a memory, to perform the camera control method in any possible implementation disclosed in Embodiment 3, Embodiment 4, and Embodiment 5 of this application.

Optionally, in an implementation, the chip may further include the memory. The memory stores instructions. The processor is configured to execute the instructions stored in the memory. When the instructions are executed, the processor is configured to perform the camera control method in any possible implementation disclosed in Embodiment 3, Embodiment 4, and Embodiment 5 of this application.

Compared with the conventional technology, the technical solutions have at least the following beneficial effects:

According to the camera control method and system, and the electronic device disclosed in embodiments of this application, a problem that a motor is repeatedly lifted and lowered in a scenario of quickly switching between a plurality of applications can be resolved while fewer modules are invoked to lift or lower a motor and time sequence control steps are simplified. This further resolves a problem that lifting or lowering of a motor may disorder when a foreground application and a background application are used alternately.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, and microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (tar example, a DVD), a semiconductor medium (for example, a solid-state drive (Solid State Disk)), or the like.

In the foregoing embodiments, the processor may include, for example, a central processing unit (central processing unit, CPU), a microprocessor, a microcontroller, or a digital signal processor, and may further include a GPU, an NPU, and an ISP. The processor may further include a necessary hardware accelerator or a logic processing hardware circuit, for example, an application-specific integrated circuit (application-specific integrated circuit, ASIC), or one or more integrated circuits configured to control programs to perform the technical solutions in this application. In addition, the processor may have a function of operating one or more software programs, and the software program may be stored in the memory.

The memory may be a read-only memory (read-only memory, ROM), another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage medium, an optical disc storage medium (including a compact optical disc, a laser disc, an optical disc, a digital versatile optical disc, a Blu-ray disc, and the like), a magnetic disk storage medium or another magnetic storage device, any other medium that can be used to carry or store expected program code in a form of instructions or a data structure and that can be accessed by a computer, or the like.

In embodiments of this application, "at least one" means one or more, and "a plurality of" means two or more. The term "and/or" describes an association relationship for describing associated objects and indicates that three relationships may exist. For example, A and/or B may indicate the following three cases: Only A exists, both A and B exist, and only B exists. A and B may be in a singular form or a plural form. A character "/" generally indicates an "or" relationship between the associated objects. At least one of the following items and similar expressions refer to any combination of the items, including a single item or any combination of plural items. For example, at least one of a, b, and c may indicate a, b, c, a and b, a and c, b and c, or a, b, and c, where a, b, and c may be singular or plural.

A person of ordinary skill in the art may be aware that, with reference to the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments. Details are not described herein again.

In embodiments of this application, when any of the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk drive, a read-only memory (read-only memory, ROM), a random access memory (random access memory, RAM), a magnetic disk, or a compact disc. The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method implemented by an electronic device, wherein the method comprises:
    triggering, by a first application running on the electronic device, a first stream-on instruction instructing a photographing apparatus of the electronic device to collect a first image and output the first image to the first application;
    receiving, by the photographing apparatus through a first channel or a second channel, the first stream-on instruction, wherein the first channel is a persistent connection between a display apparatus of the electronic device and the photographing apparatus, and wherein the second channel is between the display apparatus and the photographing apparatus;
    reporting, by the photographing apparatus based on the first stream-on instruction, a first stream-on state to a proxy device in the display apparatus through the first channel;
    controlling, by the proxy device based on the first stream-on state, a lifting apparatus of the electronic device to lift or retract the photographing apparatus;
    starting, by the photographing apparatus after being lifted, capturing the first image;
    outputting the first image to the first application through the second channel; and
    stopping, by the photographing apparatus after being retracted, capturing the first image, wherein the method further comprising:
    starting a second application that needs to use the photographing apparatus, wherein the second application runs on the electronic device;
    closing the first application or switching the first application to background in response to starting the second application;
    triggering, by the first application, a first stream-off instruction instructing the photographing apparatus to stop collecting the first image and stop outputting the first image to the first application;
    receiving, by the photographing apparatus through the first channel or the second channel, the first stream-off instruction;
    reporting, by the photographing apparatus based on the first stream-off instruction, a first stream-off state to the proxy device through the first channel;
    triggering, by the second application based on the first stream-off instruction, a second stream-on instruction instructing the photographing apparatus to collect a second image and output the second image to the second application;
    receiving, by the photographing apparatus through the second channel within a preset redundancy time, the second stream-on instruction;
    reporting, by the photographing apparatus based on the second stream-on instruction, a second stream-on state to the proxy device through the first channel;
    making a determination, by the proxy device, that the first stream-off state and the second stream-on state are received successively within the preset redundancy time; and
    discarding, by the proxy device in response to the determination, the first stream-off state and the second stream-on state, wherein the proxy device does not control, based on the first stream-off state and the second stream-on state, the lifting apparatus to lift or retract the photographing apparatus,
    wherein the first application and the second application are non-background-resident applications, and wherein a non-background-resident application uses a third image collected by the photographing apparatus when running in foreground, and does not use a fourth image collected by the photographing apparatus when running in the background.

2. The method of claim 1, wherein after starting capturing the first image, the method further comprises:
    triggering, by the first application, a first stream-off instruction instructing the photographing apparatus to stop collecting the first image and stop outputting the first image to the first application, receiving, by the photographing apparatus through the first channel or the second channel, the first stream-off instruction;

reporting, by the photographing apparatus based on the first stream-off instruction, a first stream-off state to the proxy device through the first channel; and controlling, by the proxy device based on the first stream-off state, the lifting apparatus to retract the photographing apparatus.

3. The method of claim 1, wherein the first application is a background-resident application that runs in the background of the electronic device and that uses the first image, wherein the first image is not displayed on the display apparatus when the background-resident application uses the image, wherein the first stream-on instruction further comprises an identifier indicating that the first application is a background-resident application, and wherein the method further comprises:

starting a second application that needs to use the photographing apparatus, wherein the second application is a non-background-resident application running on the electronic device;

receiving, by the photographing apparatus through the second channel, a second stream-on instruction triggered by the second application, wherein the second stream-on instruction instructs the photographing apparatus to start to collect a second image and the output the second image to the second application;

skipping, by the photographing apparatus according to a second stream output instruction based on the second stream-on instruction and the identifier, sending a stream-on state to the proxy device;

receiving, by the photographing apparatus through the second channel, a second stream-off instruction triggered by the second application when the second application is closed or is switched to the background, wherein the second stream-off instruction instructs the photographing apparatus to stop collecting the second image and stop outputting the second image to the second application;

skipping, by the photographing apparatus according to the second stream-off instruction based on the second stream-on instruction and the identifier, sending a stream-off state to the proxy device; and outputting, by the photographing apparatus, the second image to the first application and the second application through the first channel.

4. The method of claim 1, wherein the first channel uses a Remote Network Driver Interface Specification (RNDIS) protocol and the second channel uses a universal serial bus (USB) video class (UVC) protocol.

5. The method of claim 4, wherein the persistent connection is a socket persistent connection established using the RNDIS protocol.

6. The method of claim 1, further comprising re-establishing the persistent connection between the display apparatus and the photographing apparatus when the persistent connection is interrupted.

7. The method of claim 1, further comprising establishing the persistent connection between the display apparatus and the photographing apparatus through the first channel when the display apparatus is powered on.

8. The method of claim 7, wherein after the display apparatus establishes the persistent connection to the photographing apparatus, the method further comprises:

reporting, by the photographing apparatus, a current stream-on/off state to the proxy device through the first channel; and controlling, by the proxy device based on the current stream-on/off state, to lift or retract the photographing apparatus.

9. The method of claim 1, wherein the electronic device comprises a large-screen device or a smart television, wherein the display apparatus comprises a display screen and a controller, wherein the photographing apparatus comprises a camera, and wherein the lifting apparatus comprises a motor.

10. An electronic device, comprising:
a photographing apparatus;
a display apparatus comprising a proxy device and configured to maintain a persistent connection with the photographing apparatus through a first channel; and
a lifting apparatus configured to lift or retract the photographing apparatus, wherein the display apparatus, the photographing apparatus, and the lifting apparatus cooperate with each other, and wherein the electronic device is configured to:
receive, by the photographing apparatus through the first channel or a second channel, a first stream-on instruction triggered by a first application, wherein the first application runs on the electronic device, wherein the second channel is between the display apparatus and the photographing apparatus, and wherein the first stream-on instruction instructs the photographing apparatus to collect a first image and output the first image to the first application;
report, by the photographing apparatus, a first stream-on state to the proxy device through the first channel;
control, by the proxy device based on the first stream-on state, the lifting apparatus to lift or retract the photographing apparatus;
start, by the photographing apparatus after being lifted, capturing the first image;
output the first image to the first application through the second channel; and
stop, by the photographing apparatus after being retracted, capturing the first image,
wherein the electronic device further configured to:
start a second application that needs to use the photographing apparatus, wherein the second application runs on the electronic device;
close the first application, or switch the first application to background in response to starting the second application;
receive, by the photographing apparatus through the first channel or the second channel, a first stream-off instruction triggered by the first application, wherein the first stream-off instruction instructs the photographing apparatus to stop collecting the first image and stop outputting the first image to the first application;
report, by the photographing apparatus based on the first stream-off instruction, a first stream-off state to the proxy device through the first channel;
receive, by the photographing apparatus through the second channel within a preset redundancy time, a second stream-on instruction triggered by the second application, wherein the second stream-on instruction instructs the photographing apparatus to collect a second image and output the second image to the second application;

report, by the photographing apparatus based on the second stream-on instruction, a second stream-on state to the proxy device through the first channel; and discard, by the proxy device, the first stream-off state and the second stream-on state when the proxy device determines that the first stream-on state and the second stream-on state are received successively within the preset redundancy time, wherein the proxy device does not control, based on the first stream-off state and the second stream-on state, the lifting apparatus to lift or retract the photographing apparatus, wherein the first application and the second application are non-background-resident applications, and wherein a non-background-resident application uses a third image collected by the photographing apparatus when running in foreground and that does not use a fourth image collected by the photographing apparatus when running in the background.

11. The electronic device of claim 10, further configured to:

receive, by the photographing apparatus through the first channel or the second channel, a first stream-off instruction triggered by the first application, wherein the first stream-off instruction instructs the photographing apparatus to stop collecting the first image and stop outputting the first image to the first application;

report, by the photographing apparatus based on the first stream-off instruction, a first stream-off state to the proxy device through the first channel; and control, by the proxy device based on the first stream-off state, the lifting apparatus to retract the photographing apparatus.

12. The electronic device of claim 10, wherein the first application is a background-resident application that runs in the background of the electronic device and that uses the first image collected by the photographing apparatus, and wherein the first image is not displayed on the display apparatus when the background-resident application uses the first image, wherein the first stream-on instruction comprises an identifier to indicate that the first application is a background-resident application and wherein the electronic device is further configured to:

start a second application that needs to use the photographing apparatus, wherein the second application is a non-background-resident application running on the electronic device;

receive, by the photographing apparatus through the second channel, a second stream-on instruction triggered by the second application, wherein the second stream-on instruction instructs the photographing apparatus to start to collect a second image and output the second image to the second application;

skip, by the photographing apparatus according to a second stream output instruction based on the second stream-on instruction and the identifier, sending a stream-on state to the proxy device;

receive, by the photographing apparatus through the second channel, a second stream-off instruction triggered by the second application when the second application is closed or is switched to the background, wherein the second stream-off instruction instructs the photographing apparatus to stop collecting the second image and stop outputting the second image to the second application;

skip, by the photographing apparatus according to the second stream-off instruction based on the second stream-on instruction and the identifier, sending a stream-off state to the proxy device; and output, by the photographing apparatus, the second image to the first application and the second application through the first channel.

13. The electronic device of claim 10, wherein the first channel uses a Remote Network Driver Interface Specification (RNDIS) protocol, and wherein the second channel uses a universal serial bus (USB) video class (UVC) protocol.

14. The electronic device of claim 13, wherein the persistent connection is a socket persistent connection established using the RNDIS protocol.

15. The electronic device of claim 10, further configured to re-establish the persistent connection between the display apparatus and the photographing apparatus when the persistent connection is interrupted.

16. The electronic device of claim 7, further configured to establish the persistent connection between the display apparatus and the photographing apparatus through the first channel when the display apparatus is powered on.

17. The electronic device of claim 10, wherein when the display apparatus establishes the persistent connection to the photographing apparatus, the electronic device is further configured to:

report, by the photographing apparatus, a current stream-on/off state to the proxy device through the first channel; and control, by the proxy device based on the current stream-on/off state, to lift or retract the photographing apparatus.

18. The electronic device of claim 10, wherein the electronic device is a large-screen device or a smart television, wherein the display apparatus comprises a display screen and a controller, wherein the photographing apparatus is a camera, and wherein the lifting apparatus comprises a motor.

* * * * *